March 20, 1928.

J. L. DELPINI

PASSENGER VEHICLE

Filed Jan. 27, 1927

1,662,961

Inventor

José Luis Delpini.

By

Attorney

Patented Mar. 20, 1928.

1,662,961

UNITED STATES PATENT OFFICE.

JOSÉ LUIS DELPINI, OF BUENOS AIRES, ARGENTINA.

PASSENGER VEHICLE.

Application filed January 27, 1927, Serial No. 163,984, and in Argentina August 12, 1926.

My present invention relates to an improved vehicle for passengers, characterized by the particular arrangement of the seats. This new arrangement, besides increasing the carrying capacity of the vehicle, does not diminish its usual commodiousness, all this whilst keeping the ordinary size of the vehicle body.

Figure 1:
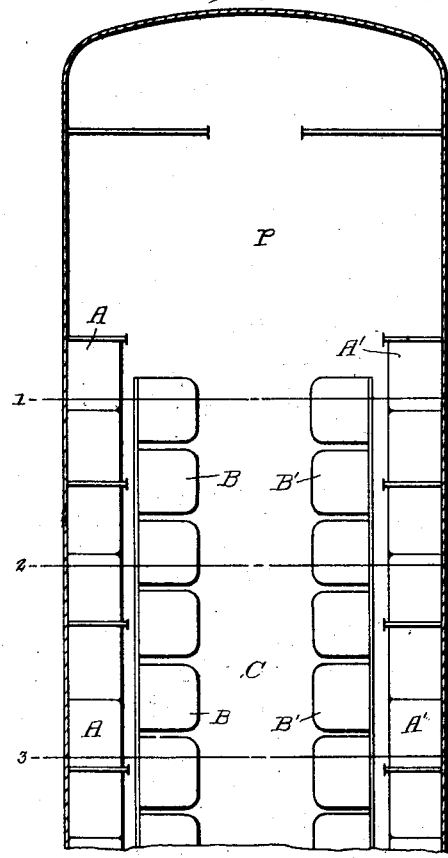
Figure 3:
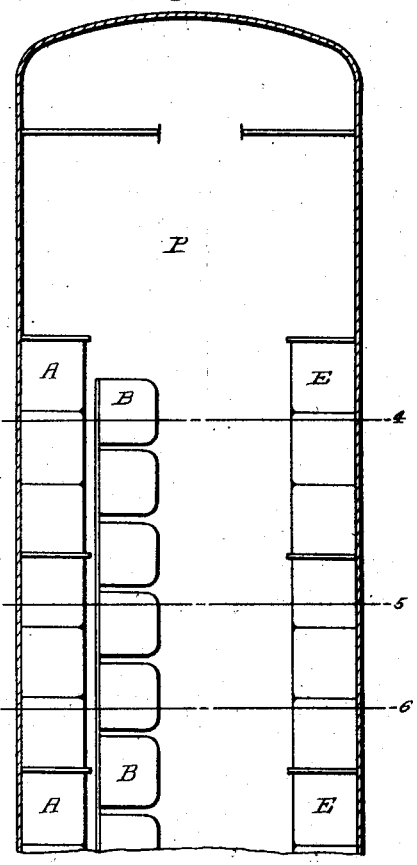
Figure 2:
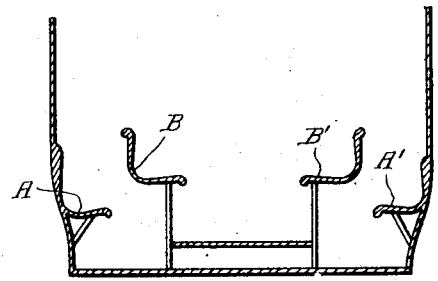
Figure 4:
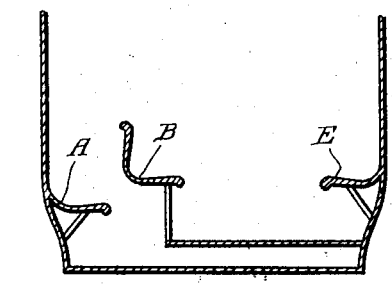

In order that my present invention may be clearly understood and easily carried into practice certain preferred embodiments thereof have been shown in the appended drawings, wherein, Figs. 1 and 3 are fragmentary plan views of two embodiments of my invention, and Figs. 2 and 4 are transverse cross sections of, respectively, Figs. 1 and 3.

Similar characters of reference denote the same or like parts throughout the said drawings.

In order to provide for the comfort of the passengers whilst maintaining a minimum width in the vehicle I propose to place the longitudinal rows of seats (A, A' and B, B', or A and B, E) step-wise as shown in the Figures 2 and 4.

In this form the legs and knees of the passengers occupying seats in the rows A and $A^1$ will have ample space beneath the seats in the rows B and B'. It is obvious that in this form the rows of longitudinal seats in each set (A and B) or ($A^1$ and $B^1$) may be placed very near each other, with a great reduction in the width of the vehicle.

In order to increase further the comfort of the passengers I have combined the stepped arrangement above described with a longitudinal displacement of the individual seats of the row A with respect to the individual seats in row B (or $A^1$ and $B^1$) so that in front of a passenger in row A there will be the free space between two seats in row B. (Fig. 1.)

The present invention may be used in connection with cars or vehicles having one or two decks, so that the benefits of the invention would be doubled in "imperial" or double decked vehicles, as the same arrangement could be used in both decks.

The possibilities of my present invention are enhanced by the fact that without elongating the car it will be possible to transport the same number of passengers as heretofore in the ordinary cars, while leaving an ample space or platform P within the car in which a considerable number of passengers may stand without blocking the central longitudinal passage C.

This central passage C may be enlarged by displacing each of the seats in row B with respect to the corresponding seat in the row B', as I have explained with respect to the seats in rows A and B. (Fig. 3.)

It is to be understood that my present invention as will be seen from the foregoing description and accompanying drawings essentially consists in vehicles the main feature of which is that, looked at in transverse section, there are two seats of which the one adjacent to the wall is substantially normal to the longitudinal axis of the vehicle and also one or more seats which have their fronts normal to the axis of the vehicle. For instance, the sections 1—1, 2—2, 3—3 in Figure 1 intercept two seats A and B with their fronts normal to the longitudinal axis of the vehicle and two further seats $A^1$ and $B^1$ also normal to the axis of the vehicle but facing in the opposite direction; the sections 4—4, 5—5, 6—6 of Fig. 3 intercept two seats facing the longitudinal axis of the vehicle (A and B) and a seat E, and so on. It is obvious that the above may be applied to any or all of the decks of the vehicle.

I claim:

1. A vehicle having seats arranged in longitudinal rows, in which the seats in the row adjacent to one side wall of the vehicle and in the next adjacent row face in a direction normal to the longitudinal axis of the vehicle, which has at least one other row of seats adjacent to the other side wall of the vehicle, the row of seats adjacent to the first mentioned side wall being disposed on a lower level than the next adjacent row of seats.

2. A vehicle having seats arranged in longitudinal rows, in which the seats in the row adjacent to one side wall of the vehicle and in the next adjacent row face in a direction normal to the longitudinal axis of the vehicle, which has at least one other row of seats adjacent to the other side of the vehicle, a passage way being disposed between the transversely facing seats and the last mentioned row, and the row of seats adjacent to the first mentioned side wall being disposed on a lower level than the next adjacent row of seats.

In testimony whereof I affix my signature.

JOSÉ LUIS DELPINI.